(12) United States Patent
DeMerritt et al.

(10) Patent No.: US 9,091,822 B2
(45) Date of Patent: Jul. 28, 2015

(54) FERRULES HAVING OPTICAL PATHWAYS AND FIBER OPTIC CONNECTORS USING SAME

(71) Applicant: Corning Cable Systems LLC, Hickory, NC (US)

(72) Inventors: Jeffery Alan DeMerritt, Painted Post, NY (US); Davide Domenico Fortusini, Ithaca, NY (US); Micah Colen Isenhour, Lincolnton, NC (US); Dennis Michael Knecht, Hickory, NC (US); James Phillip Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/887,878

(22) Filed: May 6, 2013

(65) Prior Publication Data

US 2013/0251309 A1    Sep. 26, 2013

Related U.S. Application Data

(63) Continuation of application No. PCT/US2011/059279, filed on Nov. 4, 2011.

(60) Provisional application No. 61/411,632, filed on Nov. 9, 2010.

(51) Int. Cl.
G02B 6/36    (2006.01)
G02B 6/38    (2006.01)
(Continued)

(52) U.S. Cl.
CPC .............. *G02B 6/381* (2013.01); *G02B 6/3833* (2013.01); *G02B 6/3853* (2013.01); *G02B 6/4292* (2013.01); *G02B 6/32* (2013.01); *G02B 6/3817* (2013.01); *G02B 6/3885* (2013.01)

(58) Field of Classification Search
CPC .......................................................... G02B 6/38
USPC ........................................................ 385/60, 78
See application file for complete search history.

(56) References Cited

U.S. PATENT DOCUMENTS 4,718,744 A    1/1988  Manning ....................... 350/96.2
4,840,451 A *  6/1989  Sampson et al. ................. 385/89
(Continued)

FOREIGN PATENT DOCUMENTS

CN    101656363 A    2/2010    ............. H01R 12/22

OTHER PUBLICATIONS

Patent Cooperation Treaty, International Search Report, Application No. PCT/US2011/059279, Jul. 9, 2012, 6 pages.
(Continued)

*Primary Examiner* — Jerry Blevins

(57) ABSTRACT

Plug and receptacle ferrules, and fiber optic plug and receptacle connectors that use the plug and receptacle ferrules are disclosed. Connector assemblies formed by mating the plug and receptacle connectors are also disclosed. The fiber optic connectors and connector assemblies are suitable for use with commercial electronic devices and provide either an optical connection, or both electrical and optical connections. The plug ferrule includes an open section over which light converges are diverges. The receptacle ferrule includes a receptacle optical pathway having a substantially right angle bend formed by a mirror. The plug ferrule has a plug optical pathway that interfaces with the receptacle optical pathway at a solid-solid interface that serves to substantially expel any liquid from the interface.

19 Claims, 15 Drawing Sheets

(51) Int. Cl.
*G02B 6/42* (2006.01)
*G02B 6/32* (2006.01)

(56) References Cited

U.S. PATENT DOCUMENTS

| | | | |
|---|---|---|---|
| 5,168,537 A | 12/1992 | Rajasekharan et al. | 385/89 |
| 5,619,604 A * | 4/1997 | Shiflett et al. | 385/59 |
| 5,838,857 A * | 11/1998 | Niekrasz | 385/56 |
| 7,362,934 B2 | 4/2008 | Hamano | 385/49 |
| 7,399,125 B1 | 7/2008 | Whaley et al. | 385/92 |
| 2004/0114866 A1 | 6/2004 | Hiramatsu | 385/39 |
| 2004/0202477 A1 | 10/2004 | Nagasaka et al. | 398/138 |
| 2006/0215963 A1* | 9/2006 | Hamano | 385/49 |
| 2010/0046891 A1 | 2/2010 | Sabo | 385/74 |
| 2010/0129031 A1 | 5/2010 | Danley et al. | 385/59 |
| 2010/0278490 A1 | 11/2010 | Liao et al. | 385/90 |

OTHER PUBLICATIONS

Chinese Search Report, Application No. 2011800540127, Aug. 15, 2014, 2 pages.

* cited by examiner

FERRULES HAVING OPTICAL PATHWAYS AND FIBER OPTIC CONNECTORS USING SAME

CLAIM OF PRIORITY

This application is a continuation of International Application No. PCT/US11/59279 filed Nov. 4, 2011, which claims the benefit of priority to U.S. Application No. 61/411,632, filed Nov. 9, 2010, both applications being incorporated herein by reference.

FIELD

The disclosure is directed to ferrules used in fiber optic connectors, and in particular is directed to ferrules having optical pathways, and is also directed to fiber optic connectors and connector assemblies that use such ferrules.

BACKGROUND ART

Optical fiber is increasingly being used for a variety of applications, including but not limited to broadband voice, video, and data transmission. As consumer devices increasingly use more bandwidth, it is anticipated that connectors for these devices will move away from electrical connectors and toward using optical connections. or a combination of electrical and optical connections to meet the bandwidth needs.

Generally speaking, conventional fiber optic connectors used for telecommunication networks and the like are not suitable for consumer electronics devices. For instance, conventional fiber optic connectors are relatively large when compared with the consumer devices and their interfaces. Additionally, conventional fiber optic connectors need to be deployed with great care and into relatively clean environments, and generally need to be cleaned by the craft prior to connection. Such fiber optic connectors are high-precision connectors designed for reducing insertion loss between mating connectors in the optical network. Further, though fiber optic connectors are reconfigurable (i.e., suitable for mating/unmating), they are not intended for the relatively large number of mating cycles normally associated with consumer electronic devices.

Besides operating with a relatively large number of mating/unmating cycles, consumer electronic devices are often used in environments where dust, dirt, debris, liquid and the like are ubiquitous. Consequently, fiber optic connectors used for commercial electronic devices must be designed so that dust, dirt, debris, etc., cannot readily make its way into the optical pathways between the plug and the receiver parts of the connector. Further, consumer electronic devices typically have size and space constraints for making connections and may not be amenable to straight optical pathways for the fiber optic connector. Moreover, such size and space constraints may limit the ability of the fiber optic connector to have an expanded-beam optical pathway. Such optical pathways are needed when coupling light from a divergent light source or optical fiber to a downstream photodetector, or when coupling light into an optical fiber from an upstream light source.

SUMMARY

An aspect of the invention is a plug ferrule for a fiber optic plug connector for mating with a fiber optic receptacle connector having a receptacle ferrule with a receptacle optical pathway. The plug ferrule includes a plug ferrule body having front and back ends and a central axis. At least one plug optical pathway is formed in the plug ferrule body. The plug optical pathway extends from the front end to the back end and includes a section wherein light traveling over the plug optical pathway either diverges or converges. The plug ferrule body front end has a mating geometry configured to form with the receptacle ferrule a solid-solid contact at an interface between the plug and receptacle optical pathways, with the solid-solid contact being sufficient to substantially expel liquid from the interface.

Another aspect of the invention is a receptacle ferrule for a fiber optic receptacle connector. The receptacle ferrule includes a receptacle ferrule body having a central axis, top and bottom surfaces, and opposite back and front ends. The front end has a first mating geometry. The receptacle ferrule body is configured to support at least one receptacle optical pathway between the front and back ends, with the at least one receptacle optical path having a substantially right-angle bend. The receptacle ferrule front end has a mating geometry configured to form with the plug ferrule a solid-solid contact at an interface between the plug and receptacle optical pathways, with the solid-solid contact being sufficient to substantially expel liquid from the interface.

Another aspect of the invention is a ferrule assembly that includes the plug ferrule and receptacle ferrule mated to one another.

Another aspect of the invention is a fiber optic plug connector that includes the above-described plug ferrule, a plug housing having front and back ends, and a plug ferrule assembly disposed at the plug housing front end and that operably supports the plug ferrule.

Another aspect of the invention is a fiber optic receptacle connector that includes the above-described receptacle ferrule, a receptacle ferrule holder configured to hold the receptacle ferrule, and a receptacle sleeve having front and back ends and an interior that contains the receptacle ferrule holder with the receptacle ferrule held therein.

Another aspect of the invention is a fiber optic connector assembly that includes the above-described fiber optic receptacle and plug connectors as described above, with the fiber optic receptacle and plug connectors mated to one another.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

The disclosure is directed to ferrules used in fiber optic connectors, and in particular relates to ferrules having optical pathways. The disclosure is further directed to fiber optic plug and receptacle connectors, and connector assemblies formed by mating plug and receptacle connectors so that the plug and ferrule optical pathways have a solid-solid contact interface. The solid-solid contact interface may be Hertzian, and may also have small air gaps that are often associated with contacting extended surfaces. The fiber optic connectors and connector assemblies are intended to be suitable for use with commercial electronic devices and provide either an optical connection or both electrical and optical connections (i.e., a hybrid connection). Exemplary plug and receptacle ferrules are described below in the context of the respective plug connectors and receptacle connectors used to form a connector assembly.

The discussion below makes reference to example embodiments where two optical fibers and two optical pathways are shown by way of illustration. However, the disclosure generally applies to one or more optical fibers and one or more optical pathways. In examples, the plug and/or receptacle optical pathways are expanded-beam optical pathways where the light trajectory includes at least a portion where the light rays are not collimated, i.e., they converge and/or diverge, and in some cases can include a portion where the light rays are substantially collimated.

Fiber Optic Connector Plug

Figure 1:
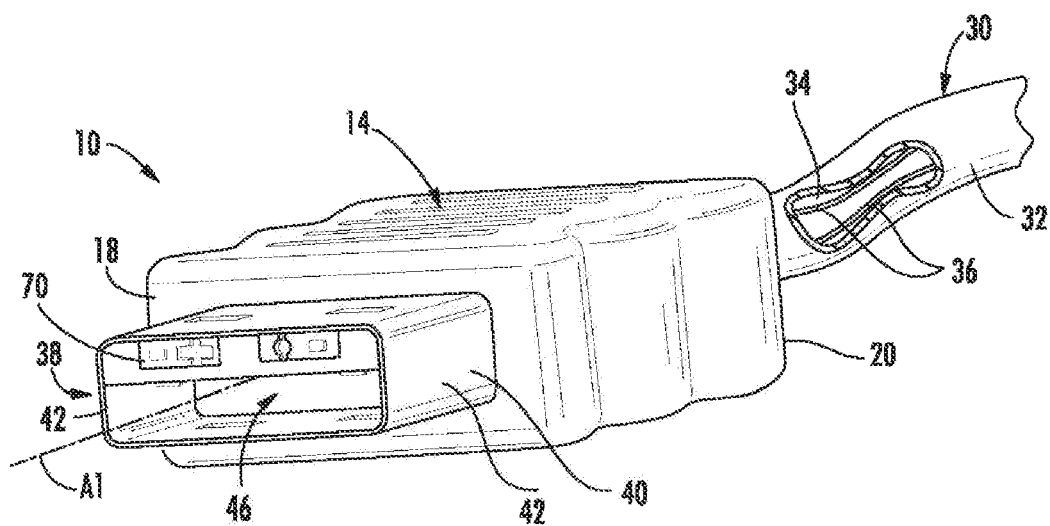
FIG. 1 is an isometric front-end elevated view of an example fiber optic connector plug.

FIG. 1 is an isometric front-end elevated view of an example fiber optic connector plug (hereinafter "plug") 10. Plug 10 includes a plug housing 14 with front and back ends 18 and 20, and a central plug axis A1. Plug housing 14 is configured to receive a fiber optical cable 30 at back end 20. Fiber optical cable 30 includes a jacket 32 that defines an interior 34 that contains one or more optical fibers 36, with two optical fibers shown by way of illustration. The two optical fibers 36 may be, for example, separate transmit and receive fibers. In an example, a boot 35 (see FIG. 6) is used when connecting fiber optic cable 30 to plug housing 14 at back end 20 to prevent significant bending of the fiber optical cable at or near the housing back end. Example optical fibers 36 are multi-mode gradient-index optical fibers.

Plug 10 includes a plug ferrule assembly 38 at plug housing front end 18. Optical fibers 36 extend from cable 30 to plug ferrule assembly 38, as described below. Plug ferrule assembly 38 includes a plug ferrule sleeve 40 having an open front end 42. Plug ferrule sleeve 40 defines a sleeve interior 46. In an example, plug ferrule sleeve 40 is in the form of a generally rectangular cylinder so that open end 42 has a generally rectangular shape associated with common types of electrical connectors, such as a USB connector.

Figure 2:
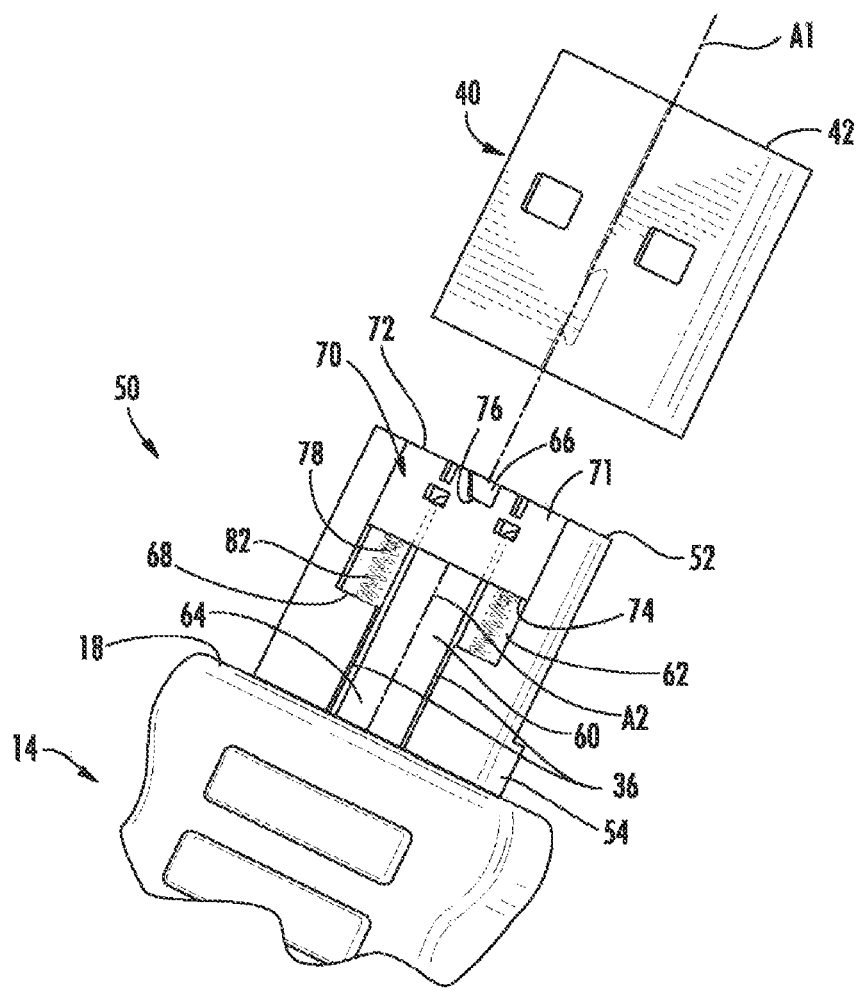
FIG. 2 is an isometric partially exploded top-down view of the fiber optic connector plug of FIG. 1, but with the plug ferrule sleeve removed to reveal a ferrule holder that otherwise resides within the sleeve interior and that supports a plug ferrule.

FIG. 2 is an isometric partially exploded top-down view of plug 10 of FIG. 1, but with plug ferrule sleeve 40 removed to reveal a ferrule holder 50 that otherwise resides within sleeve interior 46 and that may extend into plug housing 14. Ferrule holder 50 includes front and back ends 52 and 54, with the back end adjacent plug housing front end 18. Ferrule holder 50 also includes a slot 60 having a wide section 62 adjacent front end 52, and a narrow section 64 adjacent back end 54. A detent 66 exists at front end 52 along axis A1. The purpose of detent 66 is discussed below.

The transition between the wide and narrow slot sections 62 and 64 defines ferrule holder internal wall sections 68 on either side of axis A1 and that are generally perpendicular thereto. A generally rectangular and planar plug ferrule 70 is slidably arranged in slot 60 in wide section 62. Plug ferrule 70 has a central plug ferrule axis A2 that is co-axial with axis A1 when the plug ferrule is arranged in slot 60.

Figure 3:
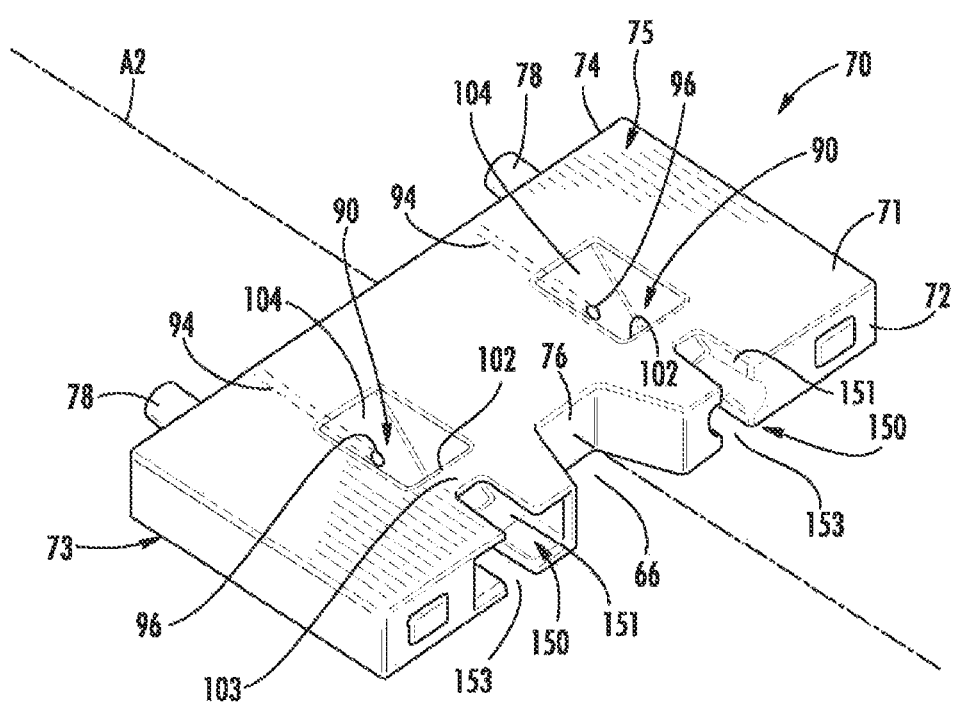
FIG. 3 is an isometric front-end elevated view of the example plug ferrule shown in FIG. 2.

FIG. 3 is an isometric front-end elevated view of the example plug ferrule 70 of FIG. 2. With reference to FIGS. 2 and 3, plug ferrule 70 includes a top surface 71, a front end 72, a bottom surface 73 and a back end 74 that define a generally flat and rectangular plug ferrule body 75. Back end 74 includes retention pins 78 located on respective sides of axis A2 and that extend parallel thereto. Plug ferrule 70 also includes an indent 76 at front end 72 and centered on axis A2. Indent 76 is configured to engage detent 66 to keep plug ferrule front end 72 from extending beyond ferrule holder front end 52 when the plug ferrule is disposed in ferrule holder 50.

In an example, plug ferrule 70 is a unitary structure formed by molding or by machining. In another example, plug ferrule 70 is formed from multiple pieces. Also in an example, plug ferrule 70 is made of a material, such as a transparent resin that transmits light 120 having an optical telecommunications wavelength, such as 850 nm, 1310 nm and 1550 nm. In an example, light 120 has a wavelength in the range from 850 nm to 1550 nm. An example transparent resin is unfilled Polyetherimide (PEI), sold by the General Electric Company under the trademarked name ULTEM® 1010.

With reference to FIG. 2, first and second resilient members 82 are arranged between respective ferrule holder internal wall sections 68 and plug ferrule back end 74 and engage respective retention pins 78. When plug ferrule 70 is subjected to a pushing force along its central axis A2, resilient members 82 compress against internal walls 68, thereby allowing the plug ferrule to slide within slot 60 backward toward the internal walls. When the pushing force is removed, resilient members expand and urge plug ferrule 70 back to its original position at slot front end 62. In an example, resilient members 82 comprise springs. A pushing force can arise for example when plug 10 is inserted into and mated with a receptacle, as discussed below.

With reference again also to FIG. 3, plug ferrule 70 further includes apertures 90 formed in plug ferrule body 75 on respective sides of central ferrule axis A2 and about midway between front and back ends 72 and 74. Apertures 90 extend through plug ferrule body 75 from top surface 71 to bottom surface 73. The actual number of apertures 90 formed in ferrule body 75 corresponds to the number of optical fibers that are supported by plug ferrule 70. Each aperture 90 defines an open section in plug ferrule body 75. In an example, each aperture 90 is filled with air or a transparent material having a refractive index different than that of plug ferrule body 75. Thus, aperture 90 means either a hollow portion in plug ferrule 70 that is filled with air, or it means a filled portion that is filled with a material having a refractive index different than the plug ferrule body 75

Figure 4:
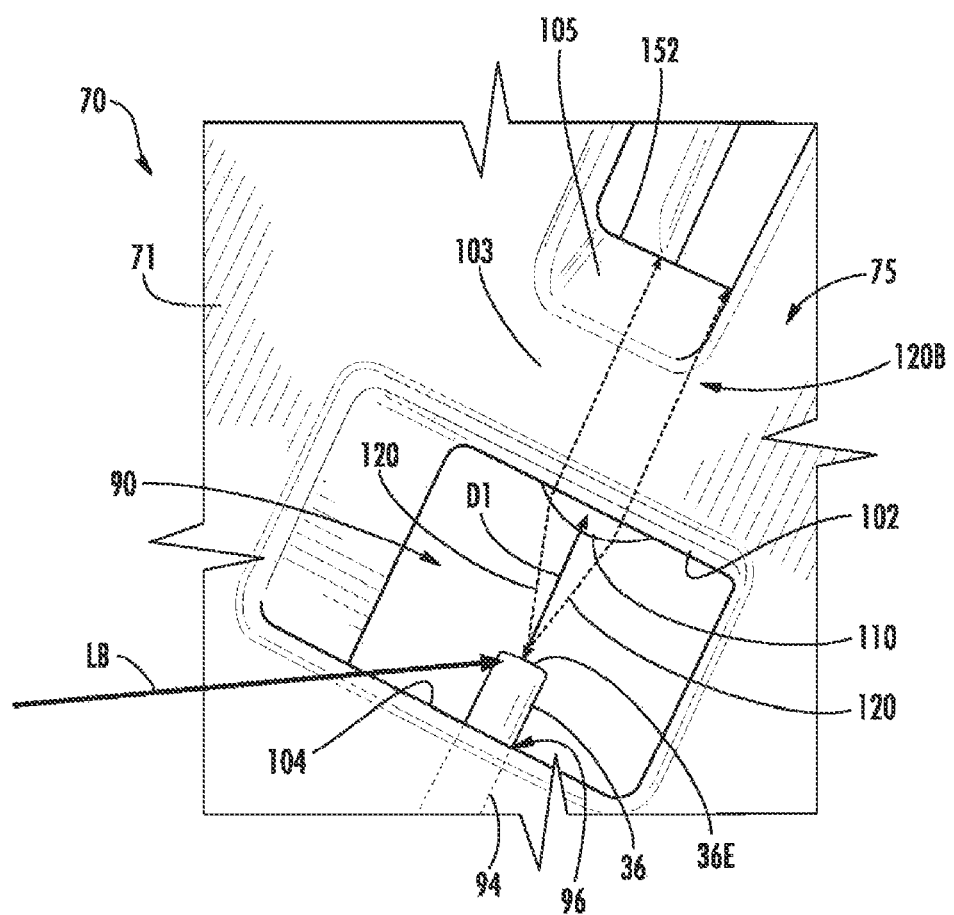
FIG. 4 is a close-up top-view of a portion of the plug ferrule of FIG. 3 and shows one of the apertures and its opposing front and back walls, with an optical fiber extending from a bore end at the back wall and a lens on the front wall.

FIG. 4 is a close-up, top-down view of a portion of plug ferrule 70 that shows one of the apertures 90. Respective bores 94 run from back end 74 to apertures 90, with a bore end 96 open at the respective apertures. Each bore 94 is sized to accommodate an optical fiber 36. In an example illustrated in FIG. 11 and discussed in greater detail below, bores 94 are configured to accommodate a covered section 36C of optical fiber 36 and an adjacent bare fiber section 36B that includes an end 36E. Plug ferrule 70 is shown as configured to support two optical fibers 36. Such a multi-fiber configuration is suitable for establishing connections having transmit and receive optical signals carried by different optical fibers. Generally, plug ferrule 70 can be configured to support one or more optical fibers 36 by including the appropriate number of bores 94, apertures 90, etc.

In an example, apertures 90 are respectively defined in part by opposing front and back walls 102 and 104. In the example of plug ferrule 70 shown in FIG. 3, a portion of back wall 104 is angled for reasons discussed in greater detail below. FIG. 4 shows an optical fiber 36 in bore 94 with optical fiber end 36E extending from bore end 96 and part way into aperture 90. A lens 110 with a focal length F1 is formed on front wall 102. Optical fiber end 36E and lens 110 are spaced apart by an axial distance D1 suitable for light 120 to be communicated between the lens and optical fiber 36. In an example, lens 110 is configured to substantially collimate light from optical fiber end 36E or to focus substantially collimated light onto the optical fiber end (depending on the direction of travel of light 120). In an example, distance D1 is substantially equal to the focal length F1 of lens 110. Thus, aperture 90 defines a section of a plug optical pathway through plug ferrule body 75 where light 120 either diverges or converges.

With continuing reference to FIGS. 3 and 4, plug ferrule 70 further includes respective recesses 150 formed in front end 72 on respective sides of axis A2. Recesses 150 align with respective lenses 110 and are separated therefrom by respective ferrule body portions 103 that define front walls 102.

Ferrule body portions 103 and recesses 150 define respective walls 152 opposite walls 102. Walls 152 thus serve as recess endwalls for recesses 150. Recesses 150 also include top and bottom slots 151 and 153 at top 71 and bottom 73, respectively. In an example shown in FIG. 4, ferrule body portions 103 include respective angled surface 105 that are angled down to walls 152.

In an example, recesses 150 have different cross-sectional shapes, such as rectangular and circular as shown in FIG. 3. The different shapes for recesses 150 serve to define a mating orientation between plug ferrule 70 and its corresponding receptacle ferrule, which is introduced and discussed below.

Figure 5:
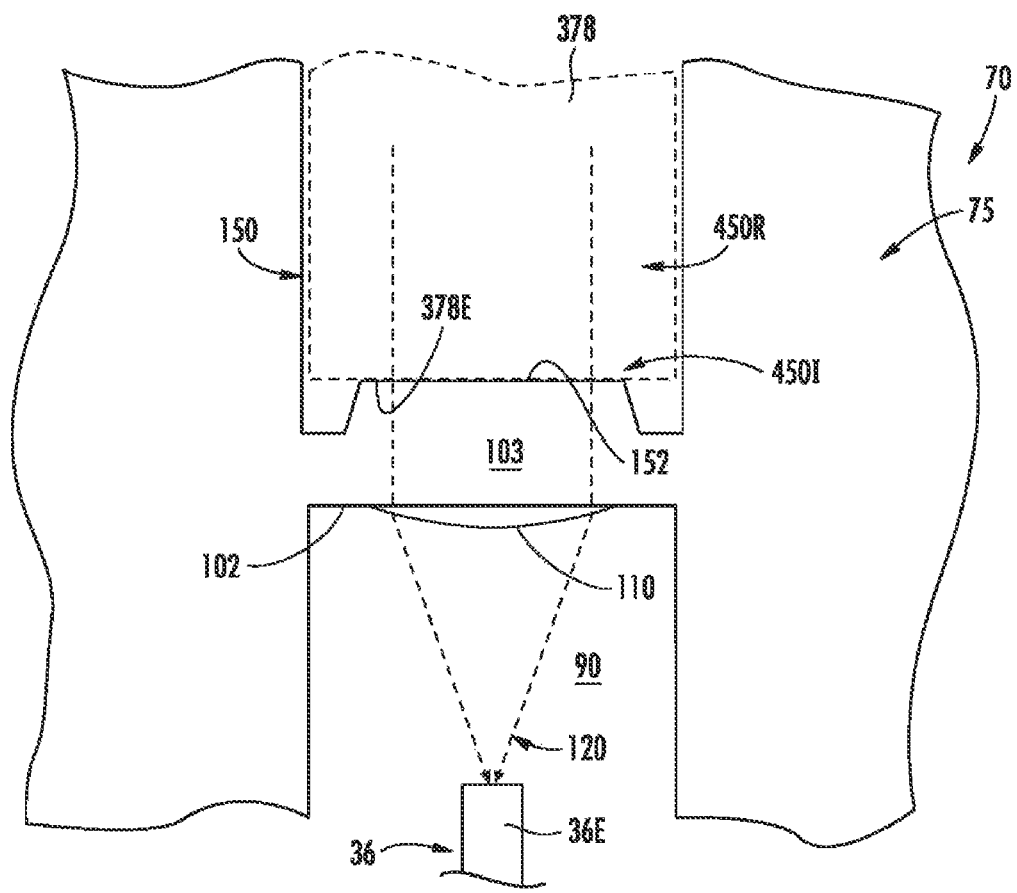
FIG. 5 is a close-up, top-down view of a portion of the plug ferrule that illustrates an example configuration where the plug recess endwall includes a pedestal where the receiver plug guide pin (shown in phantom) makes contact with the plug ferrule.

FIG. 5 is a close-up view of a portion of plug ferrule 70 that illustrates an example configuration of aperture endwall 152 that includes a pedestal 154. This pedestal configuration serves to facilitate physical contact with corresponding receptacle ferrule contact pins, introduced and discussed below. Pedestal 154 can be flat or rounded. In FIG. 5, ferrule body portion 103 does not include angled surface 105.

Fiber Optic Connector Receptacle and Ferrule Assembly

Figure 6:
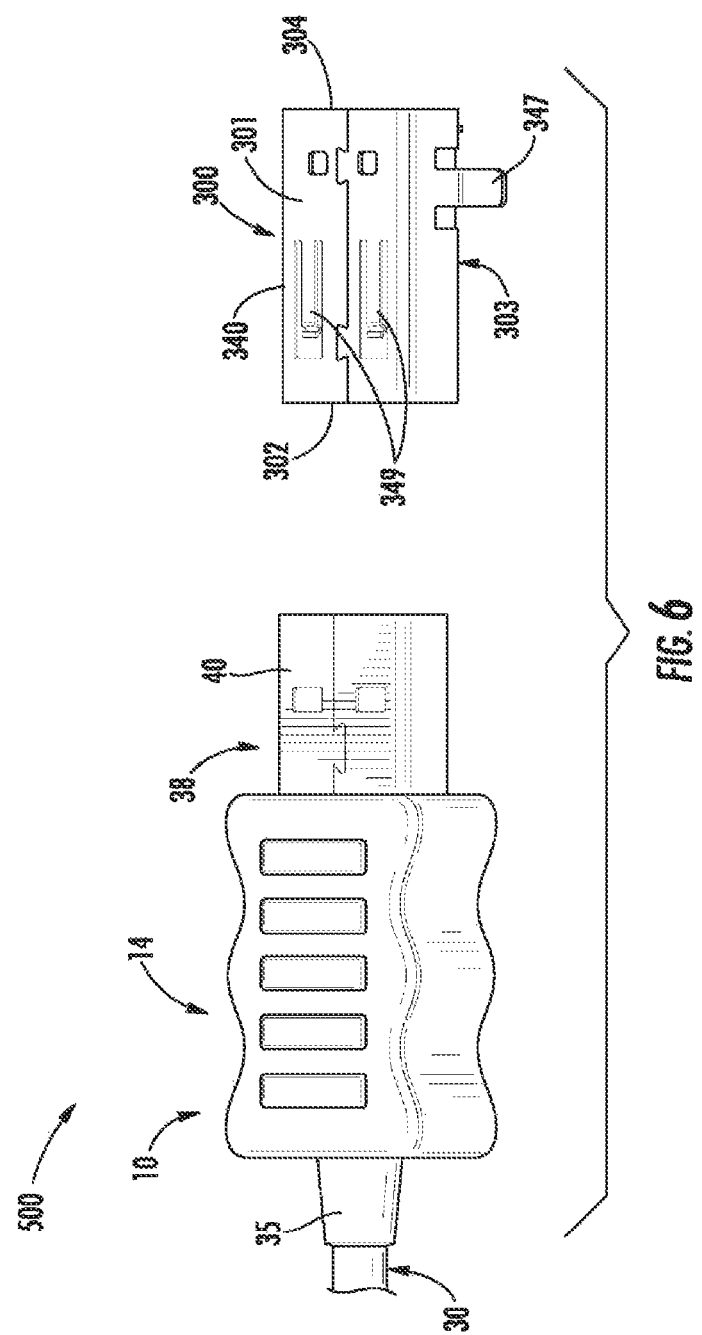
FIG. 6 is an isometric side-elevated view of the example fiber optic connector plug of FIG. 1, along with an example fiber optic connector receptacle configured to mate with the plug to form a fiber optic connector assembly.
Figure 7:
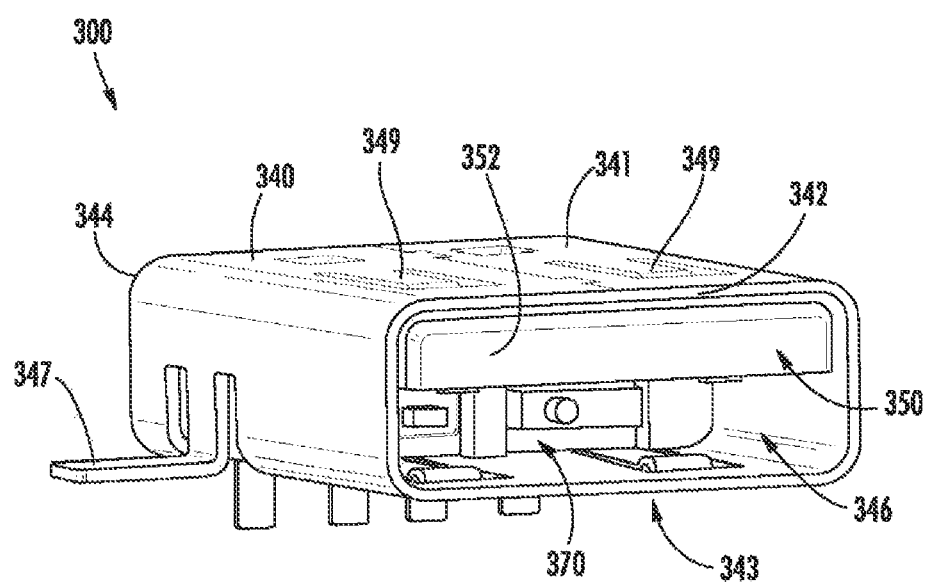
FIG. 7 is an isometric front-end view of the fiber optic connector receptacle of FIG. 6.
Figure 8:
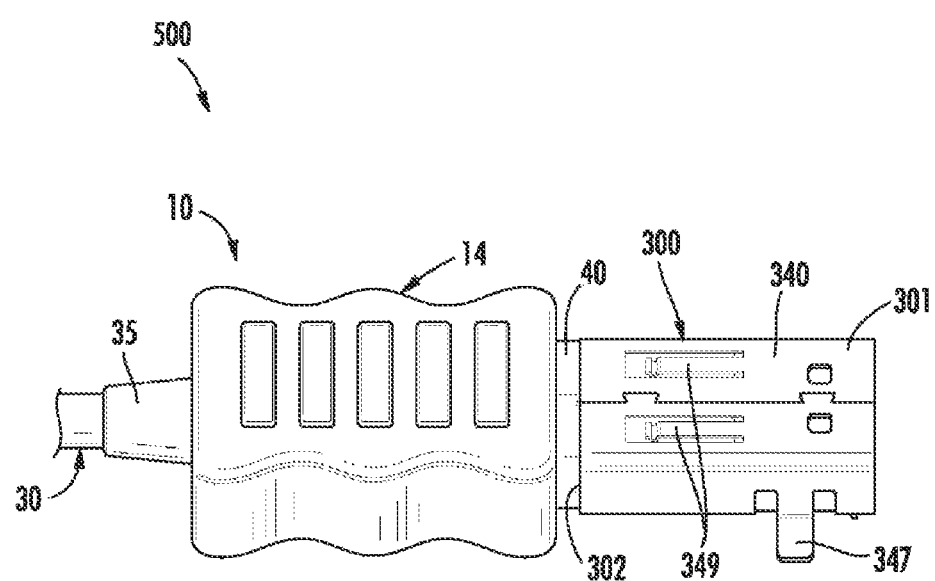
FIG. 8 is an isometric side-elevated view similar to FIG. 6 and illustrates the fiber optic connector plug mated with the fiber optic connector receptacle to form the fiber optic connector assembly.

FIG. 6 is an isometric side-elevated view of plug 10, along with an example fiber optic connector receptacle (hereinafter, "receptacle" 300) configured to mate with the plug to form a fiber optic connector assembly 500. FIG. 7 is a close-up front-end isometric view of receptacle 300. Receptacle 300 includes a receptacle ferrule sleeve 340 having an open front end 342. Receptacle ferrule sleeve 340 defines a sleeve interior 346. In an example, receptacle ferrule sleeve 340 is in the form of a generally rectangular cylinder so that open end 342 has a generally rectangular shape associated with common types of electrical connectors, such as the aforementioned USB connector. FIG. 8 is similar to FIG. 6 and illustrates plug 10 mated to receptacle 300 to form connector assembly 500. Plug 10 mates with receptacle 330 by plug ferrule sleeve 40 sliding into the receptacle ferrule sleeve 340. Receptacle ferrule sleeve 340 thus serves as a receptacle housing.

Figure 9:
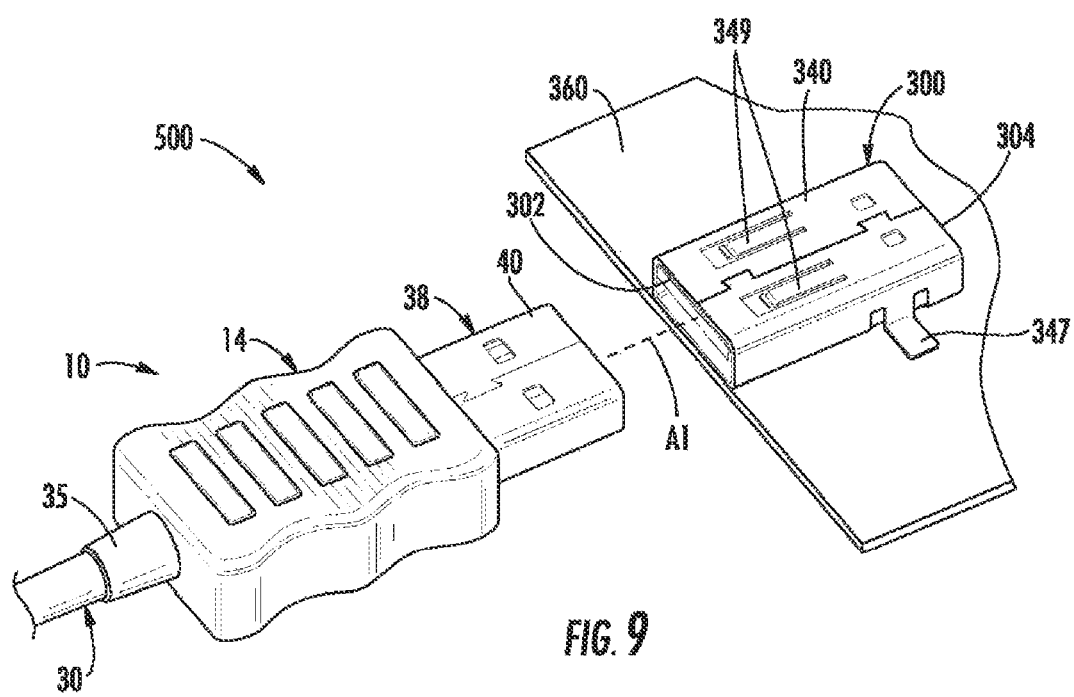
FIG. 9 is an isometric side-elevated view similar to that of FIG. 6 but showing the fiber optic connector receptacle attached to an active device platform.

Ferrule receptacle sleeve 340 includes a tab 347 used to attached the sleeve to an active device platform 360, such as a circuit board (e.g., a motherboard), as illustrated in the isometric side-elevated view of FIG. 9. Ferrule receptacle sleeve 340 also optionally includes latching arms 349 on top surface 341 for securing receptacle 300 to plug 10 when the two are mated to form connector assembly 500. Latching arms 349 are shown as having a cantilevered configuration, but can also have other suitable configurations.

As best seen in FIG. 7, receptacle 300 further includes a receptacle ferrule holder 350 that resides within receptacle sleeve interior 346 and that holds a receptacle ferrule 370. Receptacle ferrule holder 350 includes a front end 352 that substantially coincides with ferrule receptacle sleeve front end 342 and that forms a configuration for receptacle sleeve interior 346 that compliments the configuration of plug sleeve interior 46 so that the plug and receptacle can matingly engage.

Figure 10A:
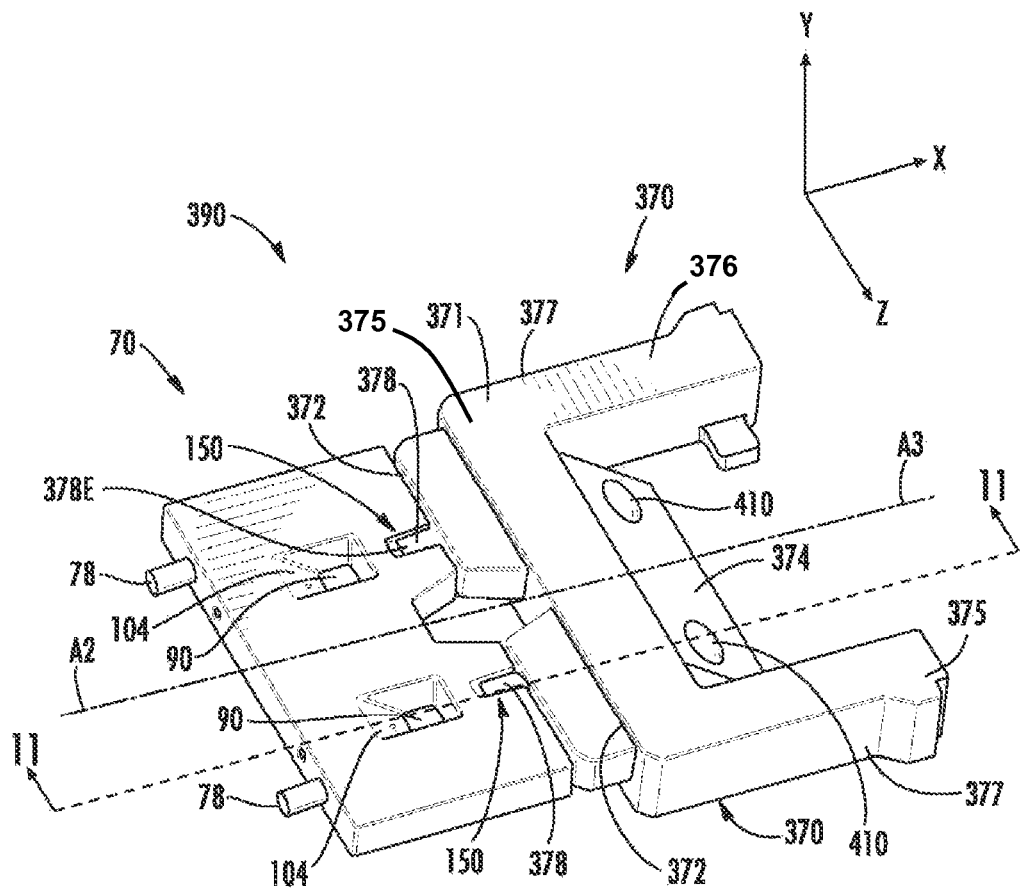
FIG. 10A and FIG. 10B are isometric top-side and bottom-side elevated views of an example receptacle ferrule shown engaged with the plug ferrule of FIG. 3 to form a ferrule assembly.
Figure 10B:
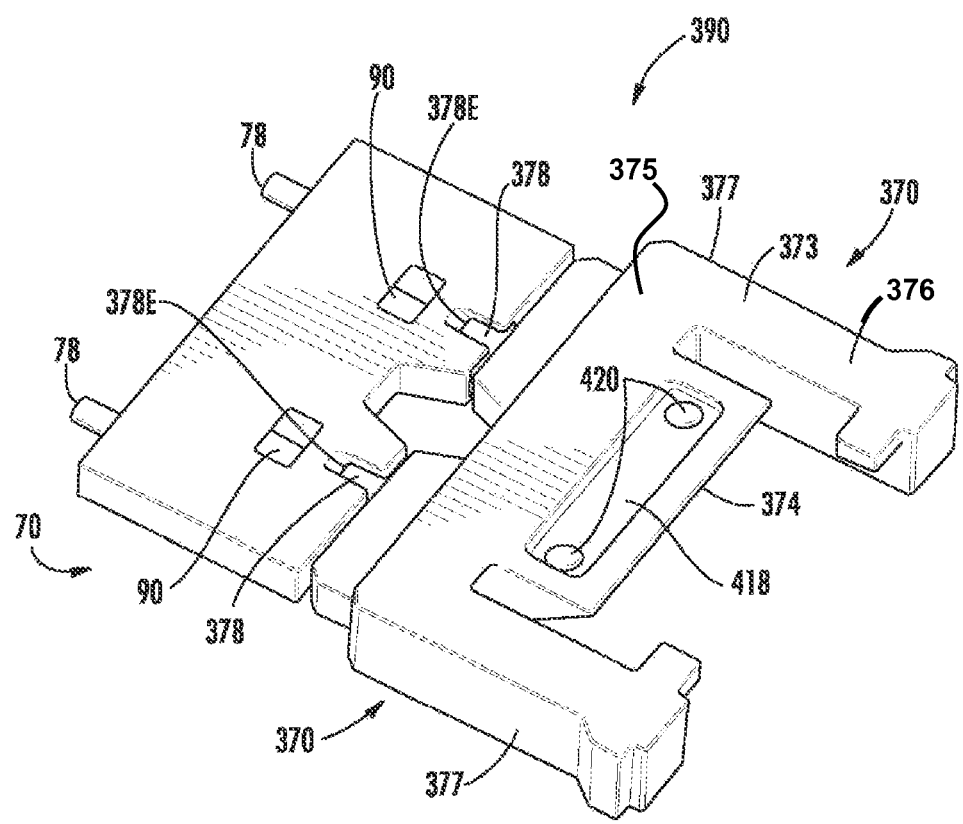

FIG. 10A and FIG. 10B are isometric top-side and bottom-side elevated views of an example receptacle ferrule 370 shown engaged with plug ferrule 70 to form a ferrule assembly 390. Cartesian coordinates are shown for the sake of reference. Receptacle ferrule 370 has a central receptacle ferrule axis A3 that is co-axial with plug ferrule axis A2 when the receptacle and plug ferrules are matingly engaged as shown. Receptacle ferrule 370 includes a receptacle ferrule body 375 having a top surface 371, a front end 372, a bottom surface 373, and a back end 374. Receptacle ferrule 370 also includes arms 376 on either side of receptacle ferrule axis A3 that define sides 377 of receptacle ferrule 370 and that give the receptacle ferrule a squared-off U-shape.

In an example, receptacle ferrule 370 is a unitary structure formed by molding or by machining In another example, receptacle ferrule 370 is formed from multiple pieces. Also in an example, receptacle ferrule 370 is made of a material such as the aforementioned transparent resin (PEI) that transmits light 120 having a telecommunications wavelength, such as 850 nm, 1310 nm and 1550 nm.

Receptacle ferrule front end 374 includes guide pins 378 located on respective sides of axis A3 and that extend parallel thereto. Guide pins 378 have respective ends 378E. In an example, guide pin ends 378E are flat, while in another example they are gently curved. Guide pins 378 are configured to respectively engage recesses 150 of plug ferrule 70 so that guide pin ends 378E make contact with or come in close proximity to plug recess endwalls 152. Plug ferrule front end 72 and receptacle ferrule front end 372 are thus configured with complimentary geometries so that they can matingly engage.

Receptacle ferrule back end 374 is angled relative to top surface 371 and includes mirrors 410 on respective sides of axis A3, with the mirrors being aligned with guide pins 378 in the X-direction. Mirrors 410 can be flat and thus have no optical power, or can be curved and have optical power. In one example, the reflectivity of mirrors 410 derives at least in part from internal reflection within receptacle ferrule body 375. In another example embodiment, a reflective layer 412 is provided on the portions of receptacle ferrule body 375 on back end 374 that define mirrors 410 to enhance the reflection (see FIG. 12, introduced and discussed below). Reflective layer 412 is thus external to but immediately adjacent receptacle ferrule body 375. In an example, mirrors 410 employ both internal reflection and reflection from the reflective layer.

With reference to FIG. 10B, receptacle ferrule 370 also includes a recess 418 formed in bottom surface 373 and in which resides lenses 420. Lenses 420 are aligned in the Y-direction with respective mirrors 410. Where mirrors 410 have optical power, lenses 420 may not be needed. Recess 418 is used to set back lenses 420 from the plane defined by the generally planar bottom surface 373. In an example, the set back is selected to provide a select distance between lenses 420 and corresponding active devices 362.

Figure 10C:
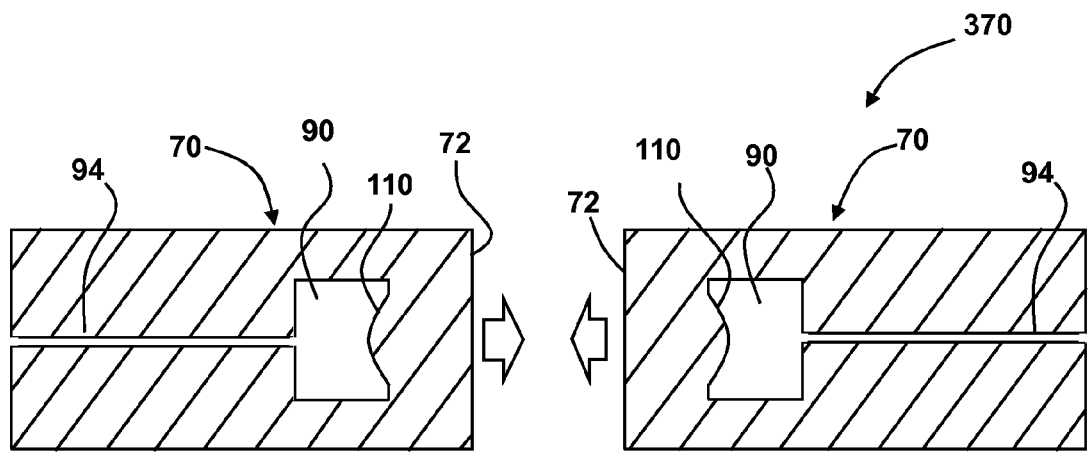
FIG. 10C and FIG. 10D are cross-sectional views of an example ferrule assembly that includes two plug ferrules, one of which is serves as a receptacle ferrule.
Figure 10D:
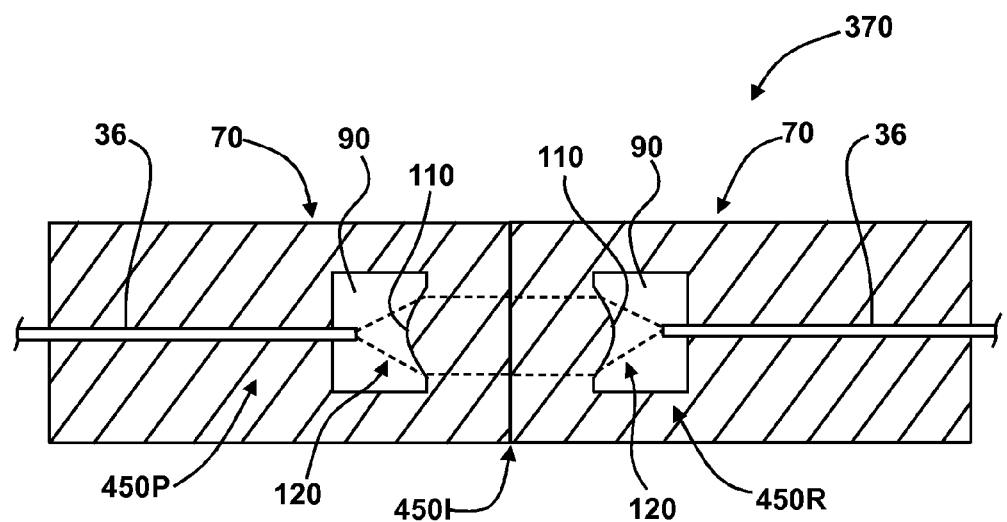

FIG. 10C and FIG. 10D are cross-sectional views of an example ferrule assembly 390 that includes two plug ferrules 70, one of which serves as a receptacle ferrule and so is labeled as 370. Front ends 72 of the two plug ferrules are configured to operably mate to form an optical pathway interface 450I having solid-solid contact between the plug ferrule front ends. In an example, the two plug ferrules 70 have complementary front-end configurations that allow for the two front ends 72 to matingly engage. In an example, light 120 is substantially collimated as it crosses over optical pathway interface 450I. In an example, plug one plug ferrule 70 may be associated with a plug connector for an optical fiber cable while the other plug ferrule may be associated with a receptacle connector of a computer or other electronic device.

Figure 11:
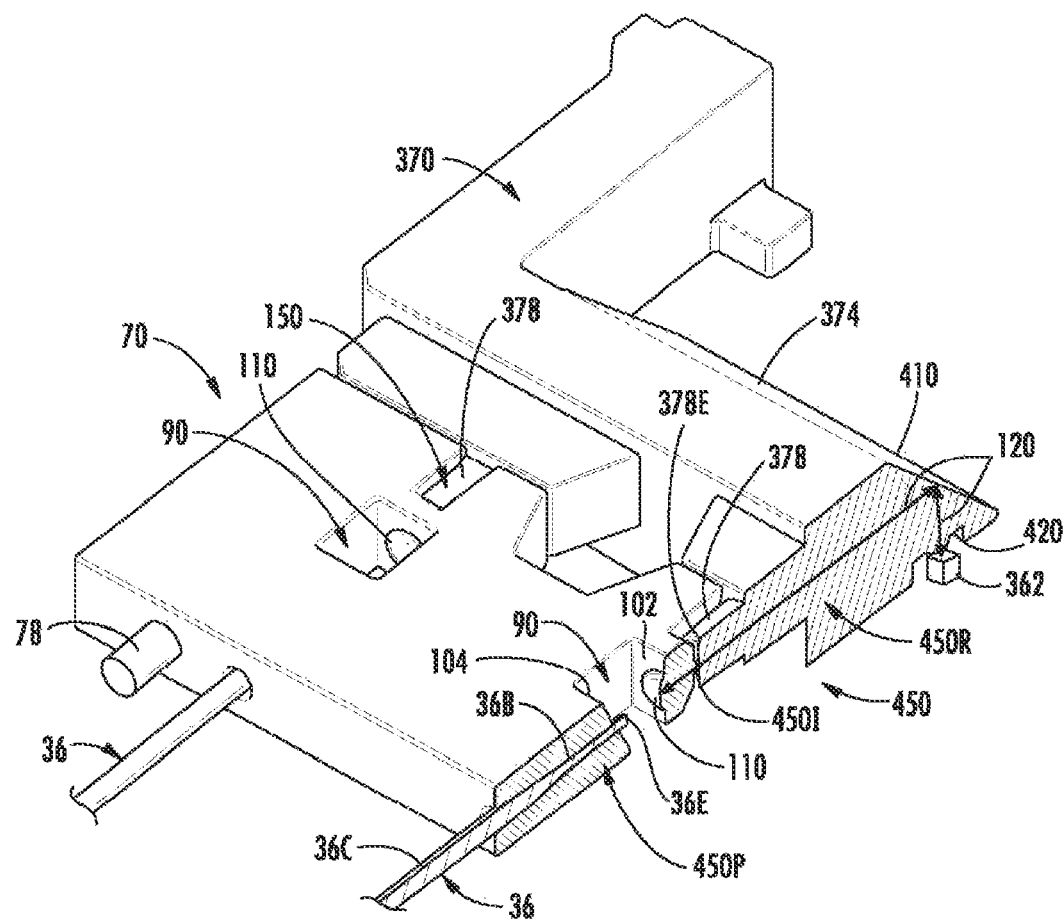
FIG. 11 is an isometric, top-side elevated and cut-away view of the ferrule assembly shown in FIG. 10A, with the cross-section taken along the line 11-11 therein.
Figure 12:
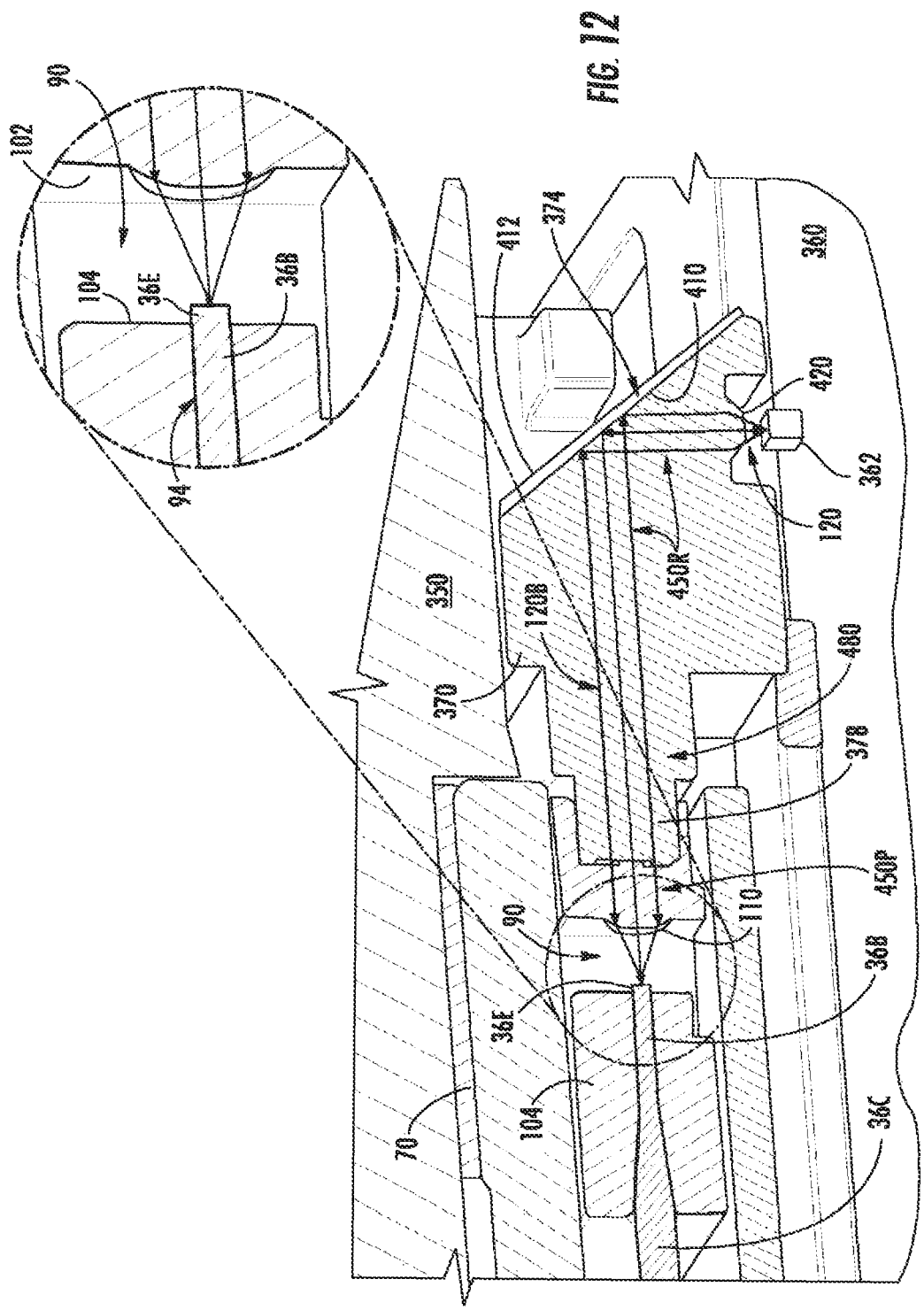
FIG. 12 is a close-up, cross-sectional view of a portion of the ferrule assembly of FIG. 11, showing the combined plug and receptacle optical pathways that join at an optical pathway interface formed by the plug recess endwall and the receptacle guide pin end.

FIG. 11 is an isometric, top-side elevated and cut-away view of the ferrule assembly 390 of FIG. 10A, as taken along the line 11-11. FIG. 12 is a close-up cross-sectional view of a portion of the ferrule assembly of FIG. 11. FIGS. 11 and 12 also show a portion of active device platform 360 that includes active device 362 in the form of a light emitter that emits light 120. An example light emitter device is a vertical-cavity surface-emitting laser (VCSEL). Active device 362 may also be a detector such as a photodiode in the case where light 120 originates at the optical fiber end of fiber optic connector assembly 500 (FIG. 8). In the present embodiment, a light emitter configuration for active device 362 is shown by way of example. In an example, active device platform 360 supports one or more active devices 362 and further in an example supports at least one light emitter and one light detector (i.e., photodetector).

FIGS. 11 and 12 show an optical pathway 450 between active device 362 optical fiber 36 and when plug 10 and receptacle 300 are mated to form ferrule assembly 390. Optical pathway 450 includes two main sections, namely a plug optical pathway 450P on the plug side, and a receptacle optical pathway 450R on the receptacle side. The plug and receptacle optical pathways 450P and 450R interface at an optical pathway interface 450I where guide pin end 378E of receptacle ferrule 370 makes contact with plug recess endwall 152 of plug ferrule 70. In an example, plug optical pathway 450P includes a first portion defined by optical fiber 36, a second portion defined by aperture 90, and a third portion is defined by ferrule body portion 103.

Thus, light 120 from active device 362 initially travels over receptacle optical pathway 450R in the Y-direction. Light 120 starts out as divergent and is allowed to expand as it travels toward lens 420. The amount of light expansion is a function of the divergence of light 120 and the distance between active device 362 and the lens. Light 120 is then substantially collimated by lens 420 to form an expanded, substantially collimated light beam 120B. Active device 362 is thus optically coupled to receptacle optical pathway 450R.

Expanded and substantially collimated light beam 120B proceeds to mirror 410, where it is reflected by 90 degrees and then travels in a direction parallel to axes A2 and A3 (i.e., along the X-direction). Receptacle optical pathway 450R thus includes a substantially right-angle bend defined by mirror 410 that allows for a right-angle optical connection to active device 362. It is assumed in the present discussion that mirror 410 has no optical power and that all the necessary optical power to substantially collimate diverging light 120 to form substantially collimated light beam 120B resides in lens 420.

Substantially collimated light beam 120B proceeds from mirror 410 through a portion of receptacle ferrule 370, including through guide pin 378 to guide pin end 378E. Receptacle optical pathway 450R interfaces with plug optical pathway 450P at optical pathway interface 450I, which in an example is defined by guide pin end 378E and plug recess endwall 152. Light beam 120B thus passes directly from receptacle 300 to plug 10 through a solid-solid optical pathway interface 450I and as an expanded, substantially collimated light beam. It is emphasized here that the receptacle optical pathway 450R need not be defined in part by guide pin 378 and can be formed in another portion of receptacle ferrule front end 372 that corresponds to the plug optical pathway 450P in plug ferrule 70.

It is noted that for embodiments involving multiple optical fibers 36, there are multiple optical pathways 450. The example configurations for plug 10 and receptacle 50 are described using two optical fibers 36 and thus two optical pathways 450.

As discussed above, optical pathway interface 450I is formed by guide pin end 378E of receptacle ferrule 370 contacting or being in close proximity to plug recess endwall 152 of plug ferrule 70 when plug 10 and receptacle 300 are engaged, thereby providing solid-solid contact between fiber end 36E and guide pin end 387E. This means that there is essentially no air space between plug ferrule 70 and receptacle ferrule 370 at optical pathway interface 450I. In other words, optical pathway 450 is not open (i.e., is closed) at optical pathway interface 450I.

This closed optical pathway interface 450I is advantageous because having an open optical pathway interface 450I can result in dust, dirt, debris, liquid or the like making its way into optical pathway 450. Such contamination can substantially reduce the optical performance of connector assembly 500 formed by mating plug 10 and receptacle 300. Even if dust, dirt, debris, liquid, etc., can work itself into optical pathway interface 450I prior to connecting plug 10 and receptacle 370, the adverse effects on performance are generally mitigated when the solid-solid connection is made. This is because any dirt or debris that makes its way into optical pathway interface 450I gets squeezed between plug recess endwall 152 and guide pin end 378E and essentially becomes a very thin and solid portion of optical pathway 450. The compressed material does not substantially contribute to Fresnel losses because it is squeezed between two solid faces, i.e., there is essentially no air interface to give rise to the kind of substantial refractive index transition needed for significant Fresnel reflections to occur. Likewise, any liquid that makes its way into optical pathway interface 450I is substantially expelled when solid-solid contact is made. Thus, the solid-solid contact at optical pathway interface 450I also serves a liquid expulsionary function.

Apertures 90 within plug ferrule 70 represent sections in plug ferrule body 75 where plug optical pathway 450P is open. Apertures 90 allow for substantially collimated light 120 to be focused by lens 110 onto optical fiber end 36E so that the optical fiber can properly received light 120 and carry it down its length. Likewise, for light 120 traveling in the other direction, aperture 90 allows for divergent light from optical fiber end 36E to expand and then be substantially collimated by lens 110. Thus, the open sections of plug optical pathway 450P as defined by apertures 90 are where light 120 either diverges or converges, depending the direction of light travel.

The open portions of optical pathway 450 defined by apertures 90 need not be directly exposed to the outside environment when connecting plug 10 and receptacle 300. In an example, apertures 90 are covered by plug sleeve 40, which serves to protect plug optical pathway 450P from dirt and debris entering the apertures. In addition, apertures 90 can be sealed after laser processing optical fibers 36 (discussed below), and can optionally contain a fluid.

Laser Processing of Optical Fibers

Apertures 90 in plug ferrule 70 facilitate laser processing of optical fibers 36 to form fiber ends 36E. Further, configuring a portion of aperture back wall 104 at an angle further facilitates laser processing of optical fibers 36 because the laser beam LB (FIG. 4) can be brought in at an angle other than 90 degrees relative to plug ferrule top surface 71. Thus, aperture 90 (and in particular angled wall 104) aids in the manufacturing of plug 10 by providing relief that reduces the chance of marking and/or damaging plug ferrule 70 with laser beam LB. Angled wall 104 reduces the chances of laser beam LB interacting with debris during the fiber cutting and/or polishing process.

Angled wall 104 can have any suitable angle and/or geometry such as between 30 degrees to 45 degrees relative to vertical (i.e., a straight up and down wall, such as shown in FIG. 4), but other suitable angles/geometry are also possible. Further, the angled wall 104 can start at any suitable distance from bore ends 96 so long as the dimensions and structural integrity of plug ferrule 70 are preserved. In other variations, angled wall 104 can also be optionally recessed backward from a vertical wall portion that contains bore end 96. By way of example, a shoulder can be formed adjacent angled wall 104, thereby permitting the angle wall to be recessed. For instance, the resultant shoulder can have a depth of about 2 microns or greater from the vertical portion of the wall.

Thus, in an example, forming plug 10 includes processing one or more optical fibers 36, including cutting and/or polishing the one or more optical fibers with laser beam LB in one or more processing steps. For instance, separate steps may be used for cutting and polishing optical fibers 36 with laser beam LB, but cutting and polishing may also occur in one step. Any suitable type of laser and/or mode of operation for creating laser beam LB can be used. By way of example, the laser (not shown) that generates laser beam LB may be a $CO_2$ laser operating in a pulsed mode, a continuous-wave (CW) mode, or other suitable mode. The angle between laser beam LB and the optical fiber 36 being processed may also be adjusted to produce the desired angle at fiber end 36E, such as 12 degrees, 8 degrees, or flat.

Plug-Receptacle Connector Configurations

Plug 10 and receptacle 300 have complementary configurations that allow for the plug and receptacle to matingly engage while allowing a user to make a quick optical or hybrid electrical and optical contact therebetween. More specifically, in an example, plug ferrule 70 and receptacle ferrule 370 are formed such that plug 10 and receptacle 300 have respective USB connector configurations, as shown for example in FIG. 6 and FIG. 8. Other common connector configurations used in commercial electronic devices are also contemplated herein and can be formed by suitably configuring plug and receptacle ferrules 70 and 370 and their respective ferrule holders 50 and 350.

Specifically, in an example, plug 10 is configured so that it is backward compatible with USB receptacles 300 that only have electrical connections and may be used with suitable USB receptacles that have optical connections, or both optical and electrical connections.

While plug and receptacle ferrules 70 and 370 have been described above with regard to their ability to support respective plug and receptacle optical pathways 450P and 450R, plug ferrule 70 and receptacle ferrule 370 can also be configured to support electrical connections and corresponding electrical pathways as well, thus providing for a hybrid electrical-optical connection.

Figure 13:
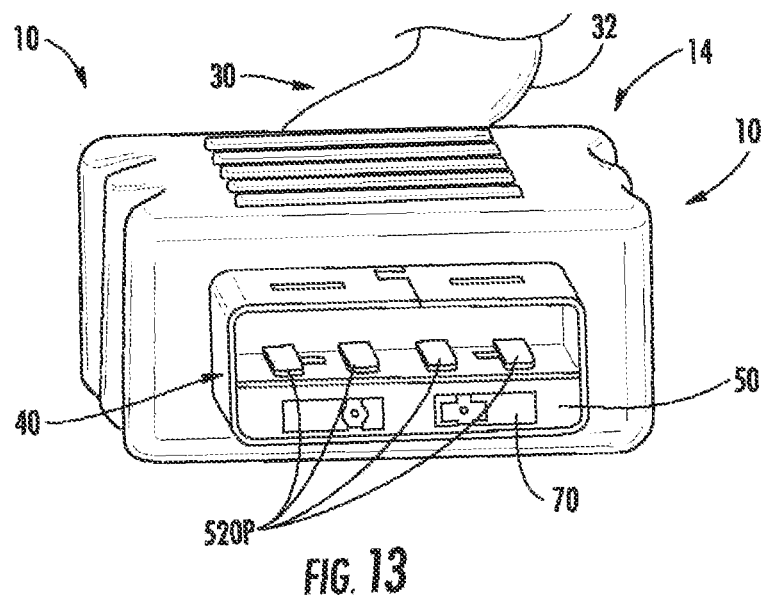
FIG. 13 is an isometric front-end view of an example plug having a plurality of plug electrical contacts.
Figure 14:
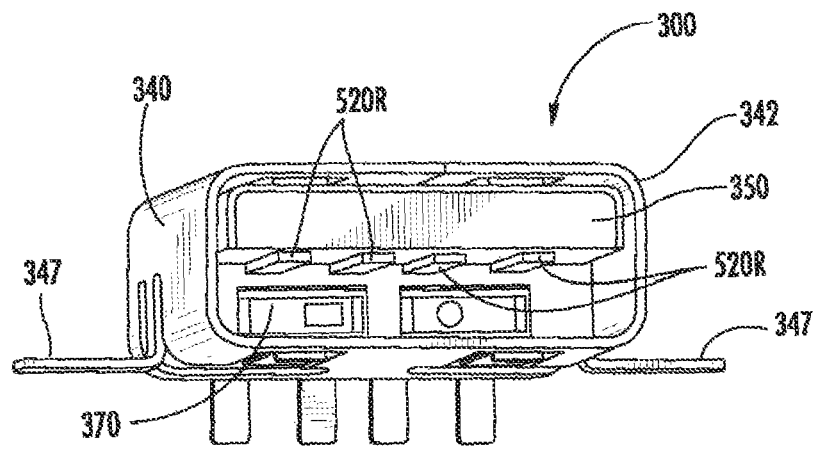
FIG. 14 is a perspective front-end view of an example receptacle having a plurality of receptacle electrical contacts that form an electrical connection with the plug electrical contacts of the plug of FIG. 13 when the plug and receptacle are mated.

FIG. 13 is a front-end isometric view of an example plug 10 that includes plug electrical contacts 520P supported by plug ferrule holder 50. FIG. 14 is a front-end perspective view of an example receptacle 300 that includes corresponding receptacle electrical contacts 520R supported by receptacle ferrule holder 350. Plug and receptacle electrical contacts 520P and 520R form an electrical connection between plug 10 and receptacle 300 when the plug and receptacle are mated. Example electrical contacts may be molded with plug and receptacle ferrules 70 and 370 so that they are relatively flush with a wiping surface of their corresponding ferrules (i.e., the horizontal surface of the ferrule that includes the electrical contacts), or have other suitable attachment means.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

What is claimed is:

1. A plug ferrule for a fiber optic plug connector for mating with a fiber optic receptacle connector having a receptacle ferrule with a receptacle optical pathway, comprising:
   a plug ferrule body having front and back ends and a central axis;
   at least one plug optical pathway formed in the plug ferrule body, the plug optical pathway extending from the front end to the back end and that includes a section wherein light traveling over the plug optical pathway either diverges or converges, wherein the optical pathway section includes an aperture in the plug ferrule body that has a front wall, with a lens formed on the front wall and in the plug optical pathway; and
   the front end having a mating geometry configured to form with the receptacle ferrule a solid-solid contact at an interface between the plug and receptacle optical pathways, with the solid-solid contact being sufficient to substantially expel liquid from the interface.

2. The plug ferrule of claim 1, wherein the aperture is filled with air or a transparent material having a refractive index different than that of the plug ferrule body.

3. The plug ferrule of claim 1, further comprising the aperture having a back wall opposite the front wall, and a bore connecting the plug ferrule body back end to the aperture back wall, wherein the bore runs substantially parallel to the central axis and is sized to accommodate an optical fiber.

4. The plug ferrule of claim 3, where the lens has a focal length and wherein the plug ferrule further includes an optical fiber supported in the bore, the optical fiber having a bare end that extends into the aperture so that the bare end is adjacent to and space apart from the lens by the lens focal length.

5. The plug ferrule of claim 3, wherein the back wall that includes an angled surface.

6. A ferrule assembly comprising:
   the plug ferrule of claim 1;
   the receptacle ferrule matingly engaged to the plug ferrule.

7. The ferrule assembly of claim 6, wherein the receptacle ferrule comprises another plug ferrule with a plug ferrule body having front and back ends and a central axis;
   at least one plug optical pathway formed in the plug ferrule body, the plug optical pathway extending from the front end to the back end and that includes a section wherein light traveling over the plug optical pathway either diverges or converges; and
   the front end having a mating geometry configured to form with the receptacle ferrule a solid-solid contact at an interface between the plug and receptacle optical pathways, with the solid-solid contact being sufficient to substantially expel liquid from the interface.

8. The ferrule assembly of claim 6, wherein the at least one receptacle optical pathway includes a substantially right-angle bend.

9. The ferrule assembly of claim 6, wherein the receptacle ferrule includes a bottom surface with a lens arranged thereon and in each at least one receptacle optical pathway.

10. A fiber optic plug connector, comprising:
    the plug ferrule of claim 1;
    a plug housing having front and back ends; and
    a plug ferrule assembly disposed at the plug housing front end and that operably supports the plug ferrule.

11. The fiber optic plug connector of claim 10, further comprising a fiber optic cable that carries at least one optical fiber, with the fiber optic cable operably connected to the connector housing back end, with the at least one optical fiber extending from the fiber optic cable and operably supported by the plug ferrule.

12. A fiber optic connector assembly, comprising:
    the fiber optic plug connector of claim 10; and
    a fiber optic receptacle connector having a receptacle ferrule that matingly engages the plug ferrule when the fiber optic plug connector is mated to the fiber optic receptacle connector.

13. The fiber optic connector assembly of claim 12, further comprising:
    an active device platform that operably supports at least one active device and that is arranged relative to the fiber optic receptacle so that the at least one active device is optically coupled to the at least one receptacle optical pathway.

14. A receptacle ferrule for a fiber optic receptacle connector mating with a fiber optic plug connector having a plug ferrule with a plug optical pathway, comprising:
    a receptacle ferrule body having a central axis, top and bottom surfaces, and opposite back and front ends, with the front end having a first mating geometry, the receptacle ferrule body configured to support at least one receptacle optical path between the front and back ends, with the at least one receptacle optical path having a substantially right-angle bend; and
    the front end having a mating geometry configured to form with the plug ferrule a solid-solid contact at an interface between the receptacle and plug optical pathways, with the solid-solid contact being sufficient to substantially expel liquid from the interface; and
    the plug ferrule matingly engaged to the receptacle ferrule, the plug ferrule comprising:
    a plug ferrule body having front and back ends and a central axis;
    at least one plug optical pathway formed in the plug ferrule body, the plug optical pathway extending from the front end to the back end and that includes a section wherein light traveling over the plug optical pathway either diverges or converges, wherein the optical pathway section includes an aperture in the plug ferrule body that has a front wall, with a lens formed on the front wall and in the plug optical pathway.

15. The receptacle ferrule of claim 14, further comprising:
    a mirror disposed at the receptacle ferrule body back end in each at least one receptacle optical path to define the substantially right-angle bend.

16. The receptacle ferrule of claim 15, further comprising:
    a lens formed on the bottom surface and respectively aligned with the mirror to substantially collimate or focus light traveling over the at least one receptacle optical pathways.

17. The ferrule assembly of claim 14, wherein the at least one plug optical path includes an open section within which light either diverges or converges.

18. A fiber optic receptacle connector, comprising:
    the receptacle ferrule of claim 14;
    a receptacle ferrule holder configured to hold the receptacle ferrule; and
    a receptacle sleeve having front and back ends and an interior that contains the receptacle ferrule holder with the receptacle ferrule held therein.

19. The fiber optic receptacle connector of claim 18, further comprising an active device platform that supports at least one active device, with the receptacle sleeve arranged relative to the active device platform so that the at least one active device is optically coupled to the at least one receptacle optical path.

* * * * *